Feb. 13, 1968    F. JINKINS    3,368,665
BELT ALIGNER
Filed Sept. 6, 1966

INVENTOR.
FRANK JINKINS
BY
HIS ATTORNEYS

United States Patent Office 3,368,665
Patented Feb. 13, 1968

3,368,665
BELT ALIGNER
Frank Jinkins, Hayward, Calif., assignor to Alloy Wire Belt Co., San Jose, Calif.
Filed Sept. 6, 1966, Ser. No. 577,305
1 Claim. (Cl. 198—202)

The present invention relates to a belt aligner, and pertains more particularly to a belt aligner wherein a pair of guide rollers are mounted one adjacent each lateral edge of a belt, such as a heavy conveyor belt, and in response to slight lateral forces exerted on the guide rollers exert a gentle but powerful aligning effect on the belt when it tends to wander one way or the other from a central aligned position therebetween.

In the past numerous belt aligning mechanisms have been developed, and several of these prior aligning mechanisms employ a pair of guide rollers mounted one adjacent each lateral edge of a belt and actuate aligning means to correct misalignment of the belt. While such prior aligning mechanisms operate satisfactorily with some types of belts, they have proven to be less than entirely satisfactory for maintaining the alignment of heavy wire mesh belts of the type used for example in the canning industry, for conveying glassware through lehrs and for other purposes. The weight of these wire mesh belts is such, the edges thereof are so subject to damage, and their cost is so great, particularly when they are made of stainless steel or other corrosion-resistant metal, that the use of a belt aligner which is apt to damage their edges is very unsatisfactory.

An object of the present invention is to provide an improved belt aligner which is capable of maintaining the alignment of heavy, wire mesh conveyor belts with little or no damage to the edges of these belts.

Another object is to provide an improved belt aligner wherein a pair of belt guide rollers are mounted one adjacent each lateral edge of a conveyor belt, each guide roller being journaled on one of a pair of levers which are pivotally mounted in laterally opposite relation on a frame which supports the belt, each lever having mounted thereon a pivotally mounted bearing in which is journaled one end of a belt support roller, the two levers being interconnected for synchronized pivotal movement.

The foregoing objects of the invention will be apparent from the following description and the accompanying drawings, wherein.

Figure 1:
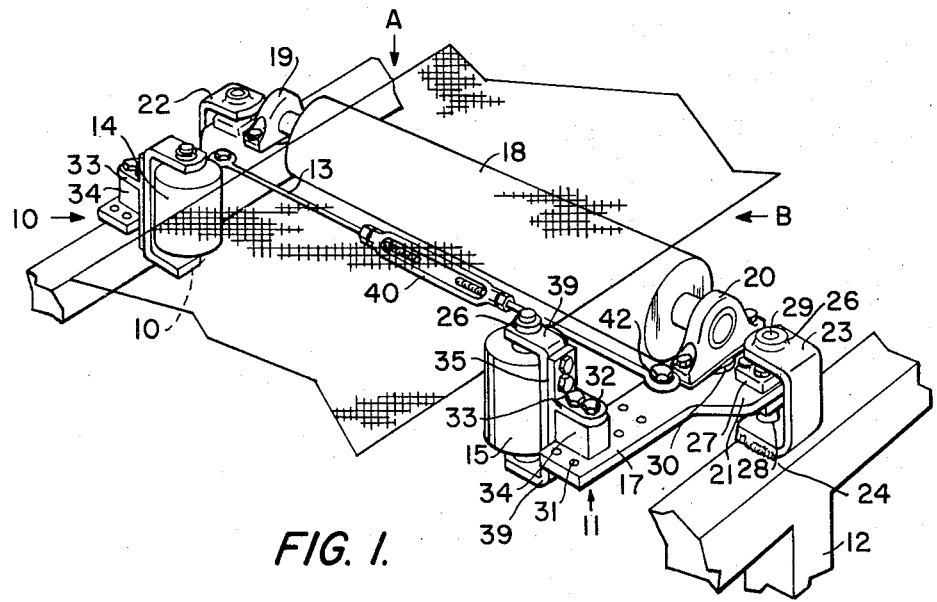
FIG. 1 is a perspective view of a belt-aligning mechanism embodying the present invention, fragments of a conveyor belt and supporting frame being shown.

Briefly, the illustrative form of the invention comprises a belt aligning mechanism A having a pair of similar but reversed levers 10 and 11 pivotally mounted one on each side of a conveyor belt frame 12 and interconnected for synchronous pivotal movement by an adjustable tie rod 13. A pair of belt guide rollers 14 and 15 are mounted one on an elongated portion 17 of each of the bell-crank levers 10 and 11, and are adjusted to apposition adjacent laterally opposite edges of a conveyor belt B which is to be maintained in central aligned position therebetween.

The conveyor belt B is supported on a belt support roller 18, the shaft of which is journaled in a pair of support bearings 19 and 20, one of which is pivotally mounted on a wider portion 21 of each of the levers 10 and 11. When the belt B tends to wander in either direction from a centered position, the belt guide roller 14 or 15 toward which the belt is misplaced is engaged by the edge of the belt and swings the lever 10 or 11, as the case may be, in a direction to move the bearings 19 and 20 and the belt support roller 18 journaled therein in a direction to correct the misalignment of the belt.

Referring to the drawings in greater detail, in the illustrative belt aligning mechanism A a pair of horizontal, U-shaped support brackets 22 and 23 are secured, as by welds 24, one to each side of the belt support frame 12. These brackets are mounted in selectively spaced, laterally opposite relation with their open ends facing inwardly. A pair of bearings 27 and 28, which preferably contain conventional ball thrust bearings, are mounted in axially aligned relation one on the upper side and one on the under side of each of the bell-crank levers 10 and 11 and are of a length to fit with the respective levers 10 and 11 into the U-shaped brackets. Each axially aligned pair of the bearings 27 and 28 is journaled for free pivotal movement on an upright pivot pin 29, which is secured in bosses 26 provided therefore in each of the U-shaped brackets 22 and 23. Since both of the bell-crank levers 10 and 11 and their associated elements are identical but reversed, the right-hand one 11 only as viewed in FIGS. 1 and 2 will be described in detail.

The bearing 20 in which is journaled the shaft of the belt support roller 18 comprises a conventional ball bearing pillow block mounted on a swivel base 30 for free pivotal movement about an upright axis a short distance inwardly from the pivotal pin 29. Thus, as the lever 11 is swung in either direction about the axis of the pivot pin 29, the bearing 20 is free for compensating swivel movement about the axis of its swivel support 30, and is thereby free to remain in co-axial relation with the shaft of the belt support roller 18 journaled therein.

A plurality of laterally spaced threaded holes 31 are provided at spaced intervals in the elongated portion 17 of the lever 11 to threadedly receive a pair of mounting screws 32 by means of which a horizontal T-shaped belt guide roller support bracket 33 and spacing block 34 are secured in adjusted position on lever 11. The spacing block 34 is of selected thickness as required to position the T-shaped bracket 33 at a height as required by the diameter of the belt-support roller 18 and the drape of the belt B.

Figure 3:
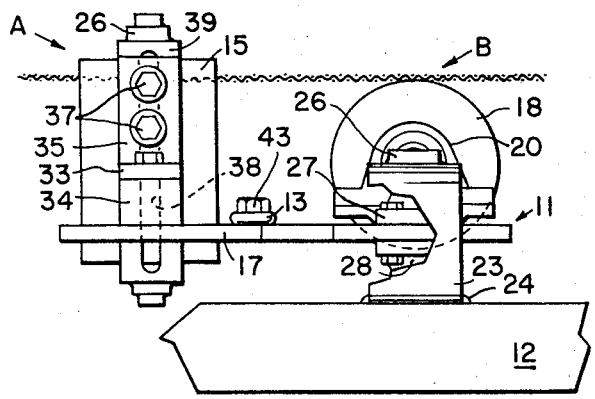
FIG. 3 is a side elevational view of the mechanism shown in FIGS. 1 and 2, portions being broken away.

The upwardly projecting arm 35 of the head portion of the T-shaped bracket 33 has a pair of holes therein to receive a pair of bolts 37, the shanks of which ride in an elongated slot 38 (FIG. 3) in a horizontal, U-shaped, guide roller mounting member 39, to permit upward or downward adjustment of the member 39 as required.

The tie rod 13 has a turnbuckle 40 centrally thereof for adjusting its length and thereby the lateral spacing between the belt guide rollers 14 and 15. An eye 42 on each end of the tie rod 13 is journaled on a stud 43 screwed into a threaded hole provided therefor in each of the levers 10 and 11, and spaced along the elongated portion 17 toward the guide roller 14 or 15, as the case may be, from the swivel base 30 of its associated bearing 19 or 20 for the belt support roller.

In using the invention the horizontal U-shaped mounting brackets 22 and 23 are secured in laterally opposite relation to each other on opposite sides of the belt frame 12, and are so spaced apart that when the elongated portions 17 of the levers 10 and 11 are substantially parallel to each other, the guide rollers 14 and 15 will be spaced apart by a distance slightly greater than the width of the belt B. Final spacing of the guide rollers is provided by adjustment of the turnbuckle 40.

With the elongated portions of the levers 10 and 11 extending in the desired direction of belt travel, the belt support roller 18 journaled in its swiveled bearings 19 and 20, the belt B properly mounted and aligned in a usual manner to ride on the roller 18, and the guide rollers 14 and 15 properly adjusted, vertically by means of the bolts 37 and laterally by the turnbuckle 40, to a position laterally adjacent their respective edges of the belt B, the mechanism is ready for use.

Figure 2:
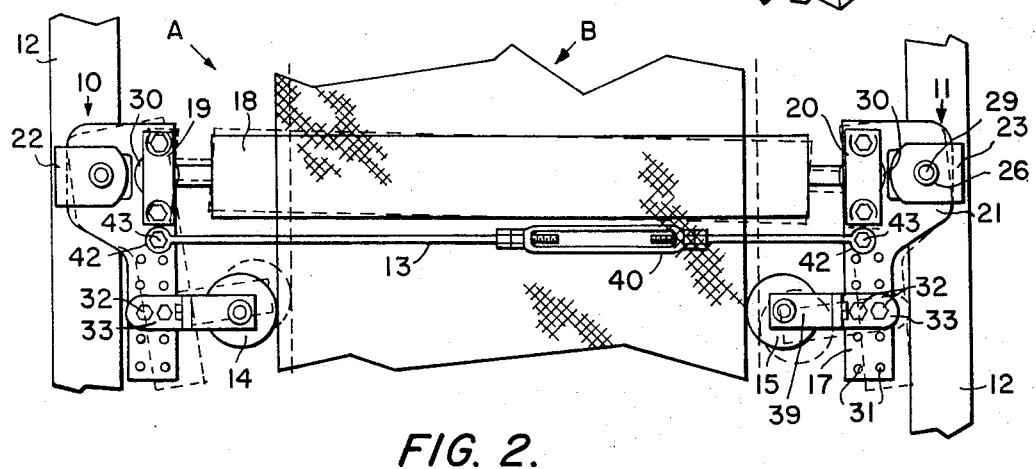
FIG. 2 is a top, plan view of the mechanism shown in FIG. 1.

With the belt B traveling in the direction of the arrows thereon in FIGS. 1 and 2, when the belt is in properly centered condition on the support roller 18, the guide rollers 14 and 15 are out of engagement with the edges of the belt, and the belt support roller 18 is at right angles to the direction of belt travel. In the event that the belt B wanders toward the right from is centered position, for example to the position indicated in broken lines in FIGS. 1 and 2, the right-hand guide roller 15 is engaged by the edge of the belt and is displaced toward the right, thereby swinging its lever 11, and by means of the tie rod 13 the other belt guide roller support lever 10, in a counter-clockwise rotative direction about their pivot pins 29. This action moves the right hand swiveled bearing 20 of the belt support roller 18 downwardly as shown in FIG. 2, and the left-hand bearing 19 upwardly, thereby rotatively moving the axis of the belt support roller 18 in a clockwise direction and urging the belt B gently toward the left.

As the belt is thus returned toward its centered condition, the belt support roller 18 is restored by the action of the belt on the left-hand guide roller 14 to its normal condition, with its axis at right angles to the direction of belt travel, and with a minimum tendency for over-running.

The invention comprises a simple, powerful belt aligning mechanism wherein there is no distortion of the bearings of the belt support roller relative to the roller axis, and the danger of damage to the belt edges is minimal.

While I have illustrated and described a preferred embodiment of the present invention, it will be understood, however, that various changes and modifications may be made in the details thereof without departing from the scope of the invention as set forth in the appended claim.

Having thus described the invention, what I claim as new and desire to protect by Letters Patent is defined in the following claim:

1. In combination with a belt support frame, a conveyor belt operatively mounted thereon for travel in a selected direction and a belt support roller mounted on the frame transversely beneath and in supporting relation to the belt; belt aligning mechanism comprising a pair of guide roller support levers mounted for pivotal movement about a fixed axis one on each side of the belt support frame and in laterally opposite, selectively spaced relation to each other, an elongated portion on each lever extending in the direction of belt travel from the axis of pivotal support of said each lever, a bearing for one end of the belt support roller mounted for swivel movement on each lever and spaced laterally inwardly toward the longitudinal center line of the belt from the pivotal support axis of its lever, means interconnecting the support levers for synchronous pivotal movement, and a pair of guide rollers journaled for free rotation in axially upright position, one on each lever and in longitudinally spaced relation in the direction of belt travel from the swivel mounted bearing for the belt support roller on said each lever, and means for adjusting each lever to position the periphery of the roller thereon with its inward periphery laterally adjacent an edge of the belt when the latter is centered on the belt support roller.

References Cited

UNITED STATES PATENTS

| | | | |
|---|---|---|---|
| 2,066,307 | 12/1936 | Horton | 74—241 XR |
| 2,521,071 | 9/1950 | Lister et al. | 74—241 |
| 2,718,156 | 9/1955 | Wright | 74—241 |
| 2,801,102 | 7/1957 | Walter et al. | 74—241 XR |
| 2,914,957 | 12/1959 | Johnson | 74—241 |
| 3,187,881 | 6/1965 | Clark | 74—241 XR |
| 3,225,902 | 12/1965 | Roinestad | 74—241 XR |

FRED C. MATTERN, JR., *Primary Examiner.*

J. A. WONG, *Assistant Examiner.*